(12) United States Patent
Kafle et al.

(10) Patent No.: US 8,274,986 B2
(45) Date of Patent: Sep. 25, 2012

(54) PACKET COMMUNICATION METHOD USING NODE IDENTIFIER AND LOCATOR

(75) Inventors: Ved Kafle, Koganei (JP); Masugi Inoue, Koganei (JP); Kiyohide Nakauchi, Koganei (JP)

(73) Assignee: National Institute of Information and Communications Technology, Koganei-Shi, Tokyo (JP)

( * ) Notice: Subject to any disclaimer, the term of this patent is extended or adjusted under 35 U.S.C. 154(b) by 235 days.

(21) Appl. No.: 12/600,207

(22) PCT Filed: May 15, 2008

(86) PCT No.: PCT/JP2008/058929
§ 371 (c)(1),
(2), (4) Date: Dec. 8, 2009

(87) PCT Pub. No.: WO2008/140113
PCT Pub. Date: Nov. 20, 2008

(65) Prior Publication Data
US 2010/0208742 A1    Aug. 19, 2010

(30) Foreign Application Priority Data

May 16, 2007   (JP) ................................. 2007-131030
Feb. 27, 2008  (JP) ................................. 2008-046763

(51) Int. Cl.
*H04L 12/56* (2006.01)
(52) U.S. Cl. .......................... 370/401; 370/328; 370/392
(58) Field of Classification Search ................. 370/401, 370/392, 310; 340/539.13, 539.22, 870.16
See application file for complete search history.

(56) References Cited

U.S. PATENT DOCUMENTS

| 2003/0070067 | A1* | 4/2003 | Saito | 713/150 |
| 2008/0164997 | A1* | 7/2008 | Aritsuka et al. | 340/539.13 |
| 2008/0313691 | A1* | 12/2008 | Cholas et al. | 725/131 |
| 2009/0216720 | A1* | 8/2009 | Piche et al. | 707/3 |

FOREIGN PATENT DOCUMENTS

JP        2005-045436 A      2/2005

OTHER PUBLICATIONS

Nishida et al., "Proposal of Packet Transport Methods for IP-host Address and IP-routing Address Separation Model in IP-based IMT Network Platform,", IEICE Technical Report, vol. 102, No. 350, pp. 105-110, Sep. 23, 2002.

(Continued)

*Primary Examiner* — Robert Wilson
*Assistant Examiner* — Mohamed Kamara
(74) *Attorney, Agent, or Firm* — Birch, Stewart, Kolasch & Birch, LLP

(57) ABSTRACT

A home node and a destination node, which are specified by node identifiers, acquire locators thereof and mapping of the node identifiers and the locators, prior to communication, and they are transmitted after the address of a packet specified by the node identifier is rewritten by the locator at the time of communication. Because roles of the node identifier and the locator are separated, the communication method is suitable for mobile communication and multi-homing. In addition, the communication method makes it possible to reduce use amount of global addresses, and thus solve an address exhaustion problem.

13 Claims, 14 Drawing Sheets

Home Network

OTHER PUBLICATIONS

Jonsson et al., "The Split Naming/Forwarding Network Architecture," Proc. First Swedish National Computer Networking Workshop (SNCNW), [online], Aug. 20, 2003, Retrieved fro the Internet on May 29, 2008.

Matos et al., "HIP Location Privacy Framework," Mibility in the evolving Internet archetiture, Proc. First ACM/IEEE international workshop on Mobility in the evolving Internet architecture, 2006, pp. 57-62.

Ahlgren et al., "A Node Identity Internetworking Architecture," INFOCOM 2006, Proc. 25th IEEE International Conference on Computer Communications, Apr. 2006, pp. 1-6.

Kafle et al, "Generic Identifiers for ID/Locator Split Internetworking", First ITU-T Kaleidoscope Academic Conference on Innovations in NGN—Future Network and Services, May 12, 2008, pp. 299-306, XP031272311.

Laganier et al., "Host Identity Protocal (HIP) Rendezvous Extension DRAFT-IETF-HIP-RVS-05", Jun. 7, 2006, pp. 1-15, XP015045657.

Laganier et al., "Host Identity Protocol (HIP) Registration Extension DRAFT-IETF-HIP-Registration-02", Jun. 7, 2006, pp. 1-14, XP015045744.

Stoica et al., "Internet Indirection Infrastructure", Computer Communication Review, vol. 32, No. 4, Oct. 1, 2002, pp. 73-86, XP001162279.

* cited by examiner

Home Network

Home Network

FIG. 8

| pID | aID | NODE NAME | NODE IDENTIFIER | GLOC | RLOC | LLOC | HASH FUNCTION | PARAMETER |
|---|---|---|---|---|---|---|---|---|
| 1100001000001000100 | 1110001000001000100 | my.pc | my.pc#mynetwork.com | GLoc11 | RLoc12 | LLoc13 | MD5 | 123 |
| 1100001000001000101 | 1110001000001000101 | silver | silver#mynetwork.com | GLoc21 | RLoc22 | LLoc23 | | |
| 1100001000001000111 | 1110001000001000111 | gold | gold#mynetwork.com | GLoc31 | RLoc32 | | | |
| | | | | | | | | |

GLOC: GLOBAL LOCATOR
RLOC: REGIONAL LOCATOR
LLOC: LOCAL LOCATOR

FIG. 10

(i) LOCATOR ASSIGNMENT REQUEST (LocAssignReq)

| DESTINATION | HOME | CONTENTS | |
|---|---|---|---|
| | | NODE IDENTIFIER | SPECIFIC VERIFICATION INFORMATION |
| HIS | HN or VN | my-pc#mynetwork.com | 1111000100011 | some password |

HN: HOME NODE, VN: VISITING NODE (ii) LOCATOR ASSIGNMENT REPORT (LocAssignRep)

| DESTINATION | HOME | CONTENTS | | |
|---|---|---|---|---|
| | | NODE IDENTIFIER | aIDs | locators | their lifetime |
| HN or VN | HIS or FIS | | | | |

(iii) NODE IDENTIFIER-LOCATOR MAPPING INFORMATION (LocAssignInfo)

| DESTINATION | HOME | CONTENTS | | |
|---|---|---|---|---|
| | | aIDs | LOCATOR | their lifetime |
| GW | HIS | | | |

(iv) ASSIGNMENT VERIFICATION REQUEST (LocAssignReq Verify)

| DESTINATION | HOME | CONTENTS | | |
|---|---|---|---|---|
| | | NODE IDENTIFIER | aIDs | SPECIFIC VERIFICATION INFORMATION |
| dHIS | FIS | | | |

FIG. 12

(v) LOCATOR RESOLUTION REQUEST (ID ResolutionRequest)

| DESTINATION | HOME | CONTENTS |
|---|---|---|
| responder | dHIS | LOCATOR ASSIGNMENT REQUEST OF your-pc#yourwork.com | to Responder from dH-IS

| DESTINATION | HOME | CONTENTS |
|---|---|---|
| Requester | responder | LOCATOR ASSIGNMENT REQUEST OF your-pc#yourwork.com |

(vi) LOCATOR RETRIEVAL NOTICE (ID ResolutionResponse)

| DESTINATION | HOME | CONTENTS |
|---|---|---|
| requester | responder | LOCATOR OF DESTINATION NODE, NODE IDENTIFIER, pID, aID, PARAMETER, HASH FUNCTION TYPE, ETC. |

(vii) COMMUNICATION INITIALIZATION REQUEST (CommInitializationRequest)

| DESTINATION | HOME | CONTENTS |
|---|---|---|
| responder | requester | NODE IDENTIFIERS OF DESTINATION AND HOME NODES, pID OF SOURCE NODE, aID, PARAMETER, LOCATOR, HASH FUNCTION LIST, ID UPDATE ALGORISM, ETC. |

(viii) COMMUNICATION INITIALIZATION NOTICE (CommInitializationResponse)

| DESTINATION | HOME | CONTENTS |
|---|---|---|
| requester | responder | NODE IDENTIFIERS OF DESTINATION AND HOME NODES, pID OF HOME NODE, aID, LOCATOR, HASH FUNCTION, ID UPDATE ALGORISM, ETC. |

(ix) : COMMUNICATION INITIALIZATION COMPLETION NOTICE (CommInitializationComplete)

| DESTINATION | HOME | CONTENTS |
|---|---|---|
| responder | requester | COMMUNICATION CONDITION |

PACKET COMMUNICATION METHOD USING NODE IDENTIFIER AND LOCATOR

TECHNICAL FIELD

The present invention relates to a communication method suitable for mobile communication and multi-homing, where roles of the node identifier and the locator in a network protocol are separated.

BACKGROUND ART

An IP address is used to identify a node in an Internet protocol (IP protocol). The use of the IP address as a node identifier and a locator has a problem of data delivery, such as making impossible mobile communication, multi-homing, security or end-to-end connection. That is, in mobile communication, the IP address changes with mobility, resulting in also change of the node identifier, which is not changed, thus it is contradictory. In addition, in multi-homing, a packet can be sent out via an another ISP, even in the case of line down, however, a plurality of IP addresses are required to utilize a plurality of ISPs, resulting in address exhaustion. In addition, also in the case where a plurality of interfaces is connected to one node, because a different node identifier becomes necessary by each interface, it not only makes address management complicated but also exhausts addresses. Further, because the Internet is originally a network where many persons can participate, it becomes difficult to ensure communication security only by the IP protocol used.

On the other hand, sensor network technology has been developing in recent years. It is a technology, for example, to acquire a sensing data obtainable from a large quantity of compact-type wireless sensor nodes via a network, and utilize this information at a place apart through the network. Such a sensor includes one configured by a sensor for measuring a state quantity (temperature, pressure, location etc.) of a measurement object or variation (low temperature/high temperature, low pressure/high pressure etc.) of the state quantity; a controller for controlling the sensor; a wireless processing unit for performing communication with a local station BST; a power source for supplying a power to the sensor, controller and wireless processing unit; and an antenna for performing transmission and reception. Because the sensor is limited as for utilizable power and has a restriction against hardware capability or scale of mounted software, a network protocol tends to be restricted. Because the IP protocol has high processing load, in many cases, a unique network protocol is used by each sensor network without mounting the IP protocol on the sensor, therefore it makes impossible to perform end-to-end communication by the IP in some cases.

As a protocol alternative to the above IP protocol, there has been proposed a host identity protocol (HIP) (Non-Patent Literature 1: R. Moskowitz and P. Nikandar, "Host Identity Protocol (HIP) Architecture," RFC 4423, IETF, May 2006. (http://www.ietf.org/rfc/rfc4423.txt)). The HIP uses a public key as the host identifier, and an IP address as the locator. This public key generates host identity tags (HIT) of 128 bits size, which identifies each other in establishing a data session, and is used in communication of a host. A host (called an initiator) requiring communication with other host (responder) acquires the public key of the responder from a DSN server for using to generate the HIT. In this protocol, all the nodes have a pair of the public key and a private key, and premise a computationally expensive cryptographic method.

In addition, there is also a new protocol based on LINA (Location Independent Network Architecture) called LIN6 (Location Independent Networking for IPv6); (Non-Patent Literature 2: M. Ishiyama, M. Kunishiki, K. Uehara, H. Esaki, and F. Teraoka, "LINA: A New Approach to Mobility Support in Wide Area Networks," IEICE Transactions on Communications, Vol. E84-B, No. 8, pp. 2076-2086, August 2001). It is one for using an Ipv6 address-type exclusive identifier as a node identifier, where the node acquires the exclusive locator and a present locator mapping from a mapping agent scattered in the Internet. The node uses an identifier for session recognition and the present locator for data packet routing. Translation between the identifier and the present locator is performed in a network layer of a protocol stack. This protocol requires two mapping agents: that is, a DSN for storing an identifier-mobility agent address, and a mobility agent for storing the identifier—the present locator. The LIN6 is said to make it possible to attain migration-transparent communication, without giving the influence on the existing Ipv6, by utilization of the LINA.

Further, there is also LISP (Locator/ID Separation Protocol); (Non-Patent Literature 3: D. Farinacci, V. Fuller, and D. Oran, "Locator/ID Separation Protocol (LISP)", IETF Internet-draft, January 2007. (http://www.ietf.org/internet-drafts/draft-farinacci-lisp-00.txt)). This protocol uses a local IP address as an end point identifier (EID), which is used also in local on-site routing. Packet routing is performed outside the local part, by using a routing locator (RLOC), which an approaching tunnel router obtains from an exit tunnel router at an object terminal. This protocol is one for focusing on reduction of routing table size, because of increase in packet tunneling overhead and diffusion of mapping information.

DISCLOSURE OF THE INVENTION

Problem to be Solved by the Invention

However, because the HIP described in the Non-Patent Literature 1 premises a computationally expensive cryptographic method, it is not suitable in the case where a cheap sensor, which needs a large quantity of installment, is anode. In addition, because a sensor is one used for supplying the information, the HIP cannot be utilized, in the case where the above end-to-end connection is impossible.

In addition, the LIN6 described in the Non-Patent Literature 2 uses the IP address-type identifier, however, it is not efficient for a network with a large packet header and a small number of nodes to be connected. In addition, because the LISP described in the Non-Patent Literature 3 also uses the IP address-type identifier, similarly as in the LIN6, it is not efficient for a network with a small number of nodes to be connected. There is an idea for increasing an address number by changing to the IPv6 increased to 128 bits, from IPv4 with 32 bits, with increase in the node, however, it is not efficient because of increased size of a packet header.

In addition, name resolution by Fully Qualified Domain Name (FQDN) using the DSN is general in the present Internet. However, because a name utilizing the DNS is basically disclosed to all nodes on the Internet, it is difficult to utilize for a name whose disclosure is not desired. Further, in the case where a communicator can be specified from a communication packet, communication having anonymity is impossible. However, needs for not willing to notify the own address is strong. In addition, there is also requirement that does not want to be specified own communication partners by tapping of the network.

In addition, in the present Internet global routing system, a BGP routing table is used, however, the number thereof has increased and it is close to a limit.

In view of the above present situation, it is an object of the present invention to provide a new packet communication method, which is capable of suitably corresponding to mobility, multi-homing management, or sensor network, ensuring security and having a less address exhaustion problem.

Means for Solving the Problem

The present inventors have found that the above problem can be solved by separating a function of the node identifier and the locator of the IP address, newly introducing a concept of a generic identity layer between a transport layer and a network layer of a network protocol layer, using the node identifier to identify a node in the transport layer or in a higher level layer, performing the mapping of the node identifier and the locator layer in the generic identity layer, and performing the routing of a packet using the locator in the network layer or in a lower level layer; and the gateway can do the routing a packet where addresses of the home and the destination are identified by the node identifier, based on the locator corresponding to the mapping, by acquiring the locator corresponding to the relevant node identifier by presenting the node identifier of a home node, and then acquiring the locator corresponding to the relevant node identifier by presenting the node identifier of a destination node, and transmitting the mapping of the node identifier and the relevant assigned locator to the gateway, and have thus completed the present invention.

In addition, it has been found that communication becomes possible even by a node, where the end-to-end is not proper, by utilizing the locator of a specific identity server of a home network, as a reference locator of the home node or the destination node, and thus the present invention has completed.

In addition, it has been found that easy resolution of the relevant identity server becomes possible, only by checking a node identifier, and resolution time of the identity server, furthermore, routing time of a packet via the identity server can be shortened, even in a global network, where many local networks, where nodes are managed by one identity server, are assembled, by using one where "an identity server name" given to the identity server which registers nodes, and "a node name" given to the node are connected via a connector, as the "node identifier", and thus the present invention has been completed. It has been found that such a node identifier is possible to suitably correspond to multi-homing etc., because it can calculate a bit stream by introducing a parameter to a cryptographic hash function, and a plurality of the node identifiers composed of the bit stream can be acquired by introducing the different parameters to one node identifier; and it is also possible to protect privacy or ensure security by rewriting the bit stream node identifier specified by the transport layer to the locator, after rewriting to other bit stream node identifier, before rewriting from the node identifier to the locator, and thus the present invention has completed.

Further, packet communication becomes possible with further less locator, by configuring a communication network in a hierarchy way with the global network, the regional network connected at a lower level thereof, and the local network connected at a lower level of the regional network etc.

Advantages of the Invention

In the present invention, because the generic identity layer was introduced to the network protocol layer, it is possible to separate influence of the node identifier and influence of the locator, in the network protocol layer.

In the present invention, because a communication session is identified by the node identifier, it is possible to change network connection without breaking the communication session, even in the case where a node moves. In addition, because a node acquires the locator prior to communication, it is possible to ensure proper routing, and to make easy mobile communication or multi-homing management, even in the case where node location changes. Therefore, the present invention is particularly effective in the next generation mobile communication or fixed networks, where mobility or multi-homing is required.

In the present invention, a node name is not especially limited, as long as it is unique in the identity server which registers the node, therefore, as the node name, such as camcoder, mypc, geteway, tv, vcr, or pda, which is a short name and a name enabling simply identification of the node, can be used. Therefore, management of the node or information obtainable from the relevant node becomes easy.

In the present invention, because one combined with the node name and the identity server is used as the node identifier, it is possible to perform packet communication, by presenting either of the node name or the node identifier for identifying the communication session.

In the present invention, in the case where a gateway has stored the locator corresponding to the node identifier in advance, it is possible to do routing of a packet, based on the corresponding locator, only by presenting the node identifier. In addition, selection of the predetermined identity server as a destination address of the packet makes it possible to transmit the packet to the predetermined identity server, and even in the case where an end-to-end connection is not present, or in the network not requiring the end-to-end connection, makes it possible to perform packet communication. In particular, because communication is possible only by presenting the node identifier, it is possible to reduce header size of the data packet, and also to shorten processing time.

Further, in the case where the communication network is configured in a hierarchy way, it is possible to select a different communication method in each network layer.

BRIEF DESCRIPTION OF THE DRAWINGS

FIG. 8 is a drawing showing one example of a correspondence table such as an ID, a node name, a node identifier or a locator, which an H-IS stores, in the communication method of the present invention.

FIG. 10 is a drawing for explaining the contents of a control packet of a signaling messages (i) to (iv) to be used in the present invention.

FIG. 12 is a drawing for explaining the contents of a control packet of signaling messages (v) to (ix) to be used in the present invention.

BEST MODE FOR CARRYING OUT THE INVENTION

Figure 1:
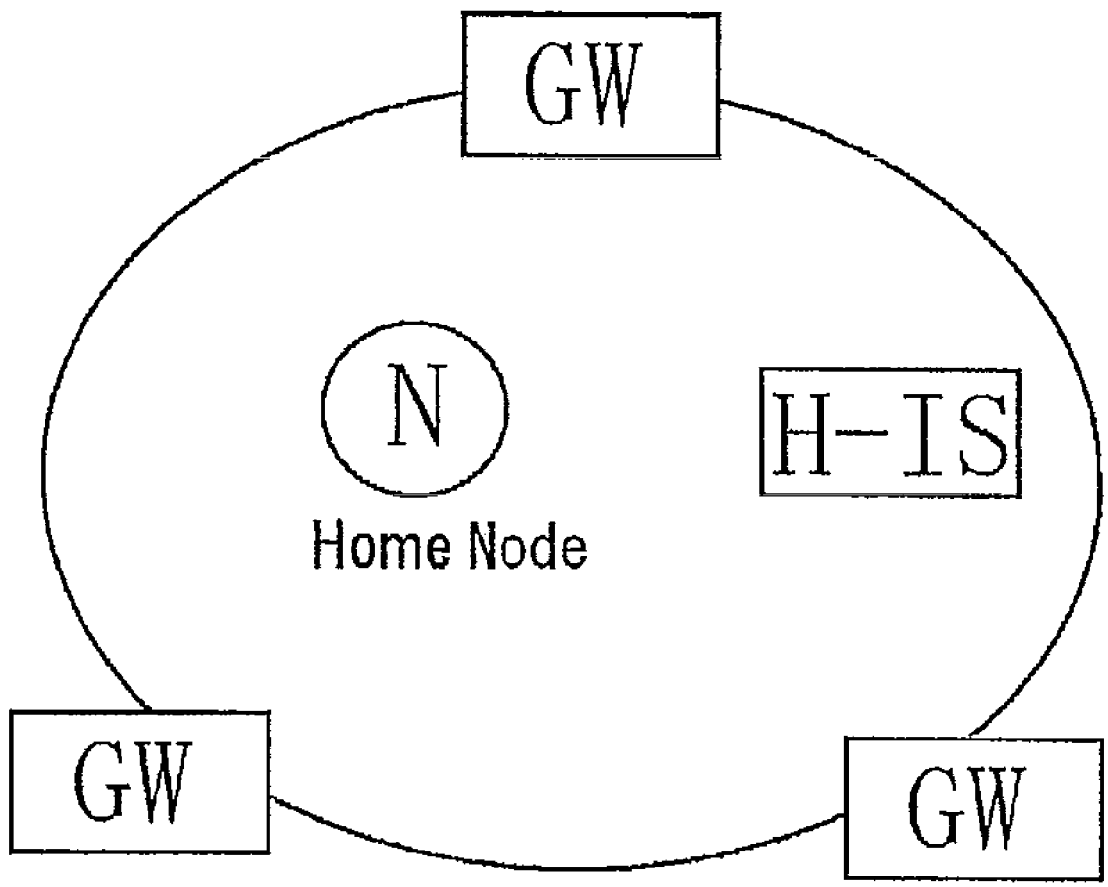
FIG. 1 is one illustration of an example of network environment of the communication method of the present invention, and the case where it is configured only by a home network.

A first aspect of the present invention is a packet communication method between a home node and a destination node, which is performed via a communication network connected with an identity server (H-IS) storing a bundle of locators and memorizing a node identifier of nodes belonging to a network, comprising:
a step in which a home node provides a node identifier of the destination node and requests an assignment of the locator to the identity server (H-IS);
a step in which the identity server (H-IS) assigns the locator to the home node, and stores correspondence relationship between the node identifier and the locator;
a step in which the home node provides the node identifier of the relevant destination node and requests an assignment of the locator from the identity server (dH-IS) of the destination node;
a step in which the identity server (dH-IS) assigns the locator to the destination node, and stores correspondence relationship between the node identifier and the locator;
a step in which a packet header, where the destination address and the home address have been specified by the node identifier of the destination node and the node identifier of the home node, is rewritten to the locator of the destination node and the locator of the locator of the home node; and
a step in which the packet performs a routing of the communication network, based on the locator.

In addition, the communication network is one having a two-hierarchy structure of a global network and a local network to be connected at the lower level of the global network; and the identity server (H-IS) of the home network and/or the identity server (F-IS) of a foreign network may be those for assigning a unique global locator in the global network and/or a unique local locator in the local network to a node of "1".

Further, the above communication network is one having a three-hierarchy structure of the global network, a regional network to be connected at the lower level of the global network, and the local network to be connected at the lower level of the above regional network; and
the locator assigned to a node by the identity server of the above home network (H-IS) may be a combination of the global locator, the regional locator and the local locator.

In addition, the bit streams of a plurality of node identifiers are generated by introducing different parameters to the cryptographic hash function, and a packet header may be one, where the destination address and/or the home address have been specified by the node identifier (pID) of the destination node and the node identifier (pID) of the home node are rewritten to the node identifier (aID) of the destination node and the node identifier (aID) of the home node, and then the aIDs of the home and the destination nodes are rewritten to the locator of the destination node and the locator of the home node. Explanation will be given below with drawings.

(1) System Configuration

Explanation will be given on a configuration of the communication method of the present invention, with reference to FIG. 1.

In the present invention, an object is a packet communication between the identity server which has stored a bundle of the locators and has stored the identifiers of the nodes belonging to a network, and a network including a gateway. A network managed by the identity server which has stored or registered the node identifiers of the nodes is called a home network of the node thereof, and the identity server is called a home server (H-IS: Home identity server). In addition, a node belonging to the home network is called a home node.

In FIG. 1, the home network is equipped with one identity server (H-IS) and three gateways (GW), however, it may be enough that at least one GW is present, and it may be one where the H-IS is provided with GW function.

Figure 2:
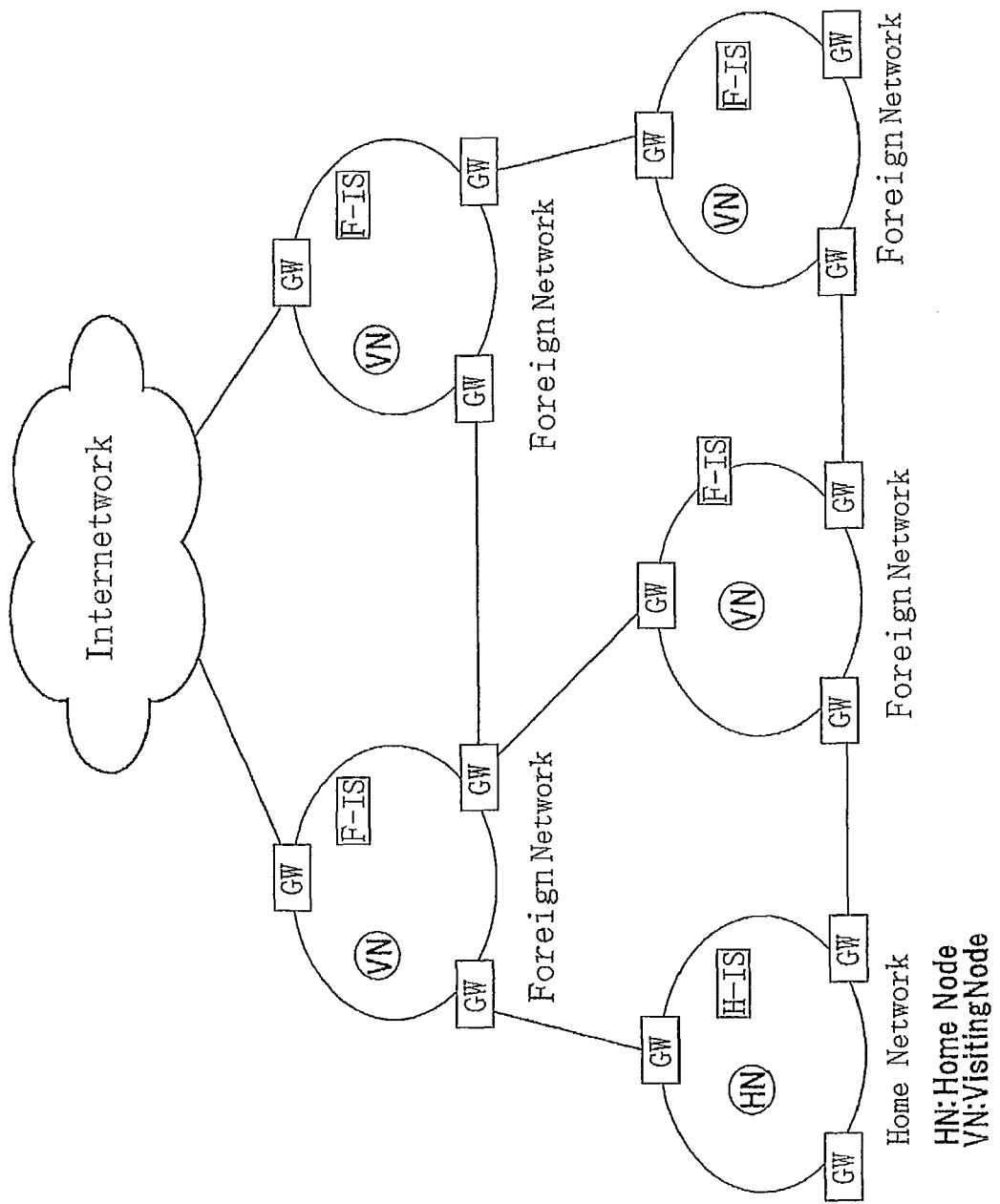
FIG. 2 is one illustration of an example of network environment of the communication method of the present invention, and the case where a home network includes a foreign network.

In addition, because the communication method of the present invention can communicate between the home nodes present in the home network, it may be enough that at least one home network exists. In addition to the home network, other network (hereafter referred to as a foreign network), which is operated by the identity server where the locator of the home node is not stored, may be included. Such a foreign network also takes the same system configuration as that of the home network, excluding that the node identifier of the home node is not stored or registered in the identity server thereof. In this way, it is possible to initialize communication, even in the case where a certain node is present in the foreign network other than the home network. It should be noted that, for making the matter simple and convenient, the identity server of the foreign network is called an F-IS (Foreign identity server), and the case where the node located in the foreign network is called a "visiting node". The F-IS does not store the node identifier of the visiting node. The communication network of the present invention may be one further connected to a global network such as the Internet. FIG. 2 shows an aspect of the global network where the home network and a plurality foreign network are mutually connected, and further connected to the Internet.

Figure 3:
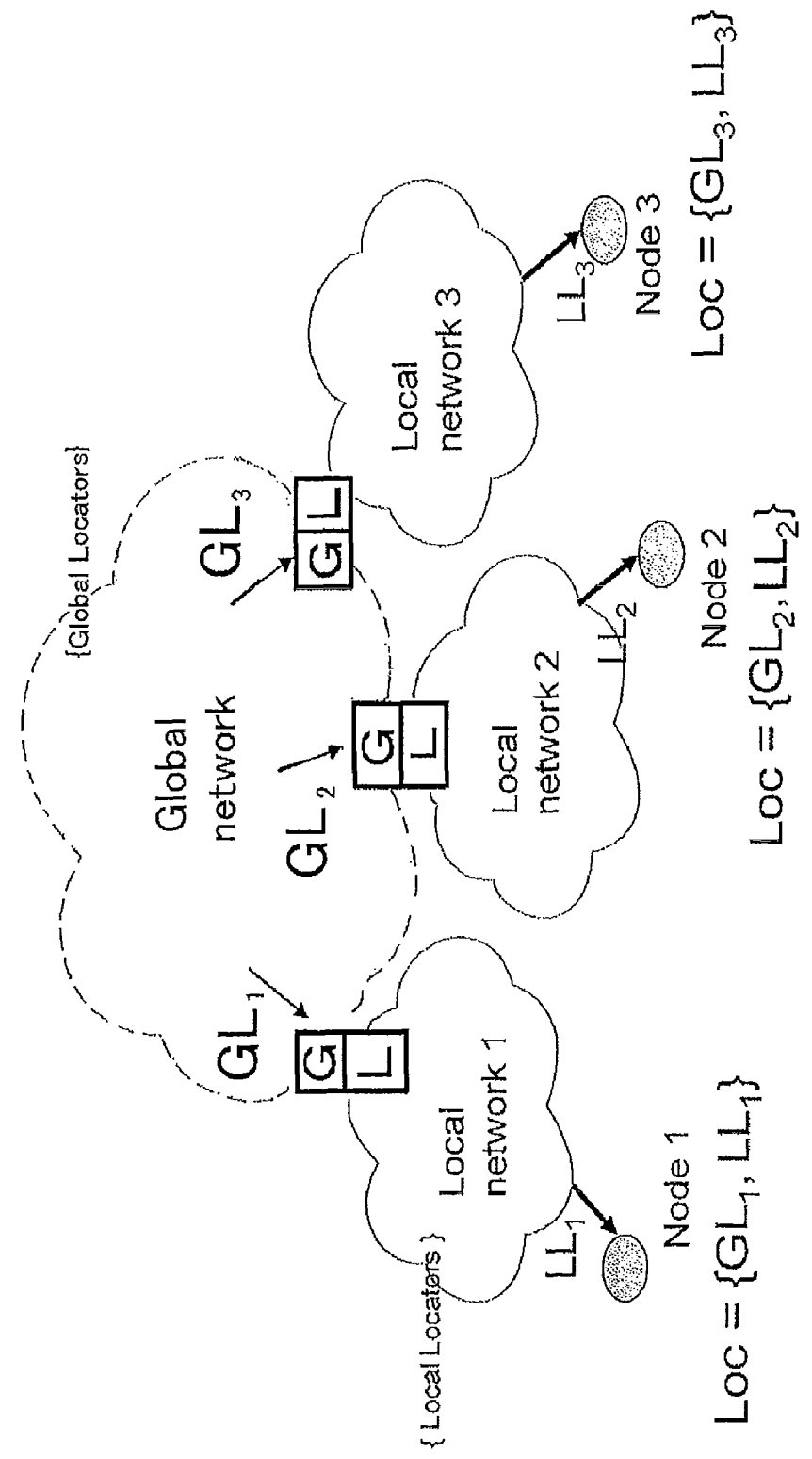
FIG. 3 is one illustration showing a layer configuration, a GW, a locator, a node, in the case where the communication network of the present invention has a two-layer structure of a global network and a local network connected at a lower level of the global network.

On the other hand, the communication network of the present invention may be one where the above home network or foreign network forms a local network connected at a lower level of the global network, respectively. This aspect is shown in FIG. 3. In FIG. 3, a local network 1, a local network 2 and a local network 3 are connected at a lower level of the global network, and each of a node 1, a node 2 and a node 3 is connected to each local network. In the present invention, this aspect is called a two-hierarchy structure of the global network and the local network.

Figure 4:
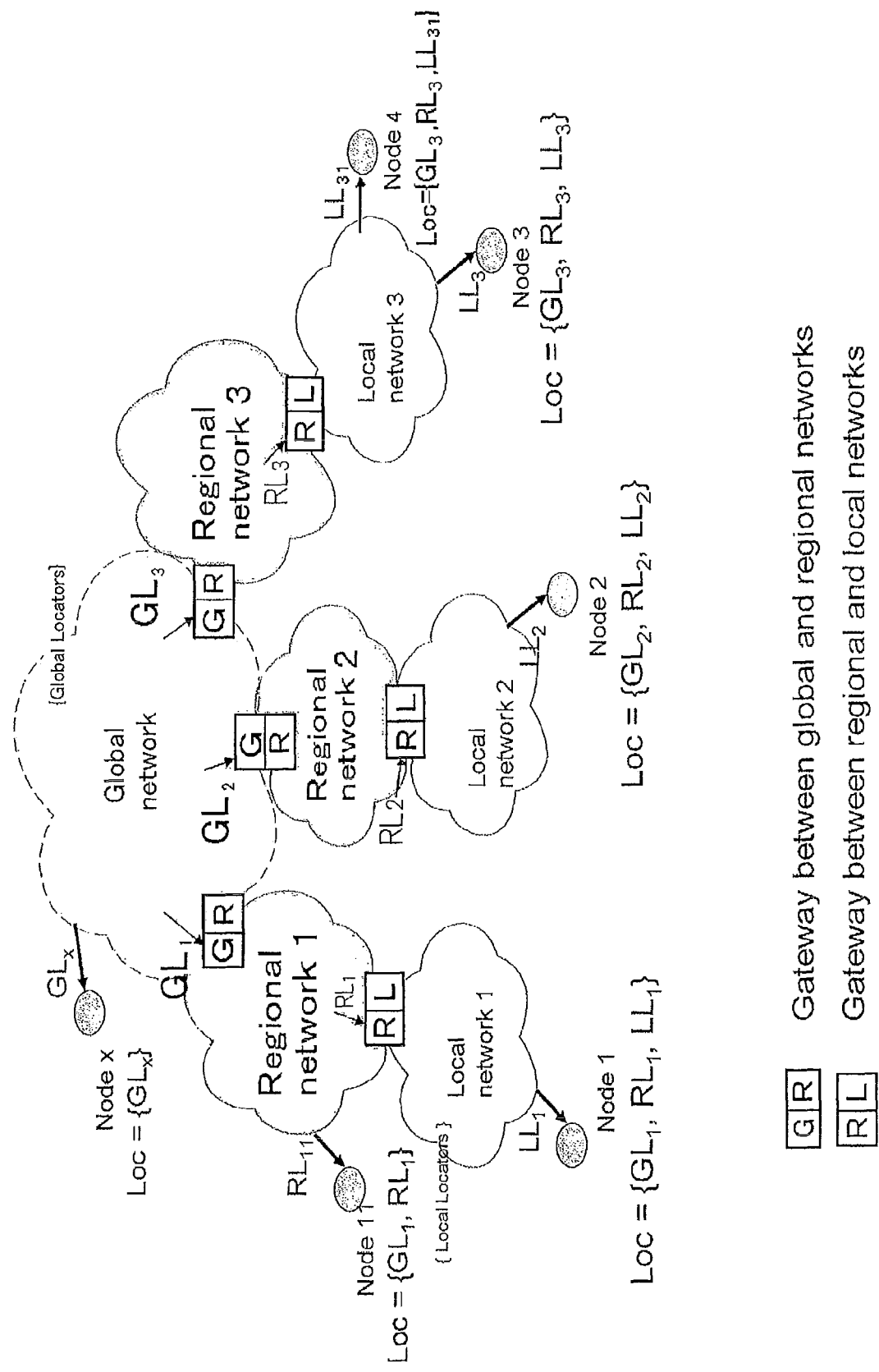
FIG. 4 is one illustration showing a layer configuration, a GW, a locator, a node, in the case where the communication method of the present invention has a three-layer structure of a global network, a regional network connected at a lower level of the global network, and a local network connected at a lower level of the regional network.

On the other hand, the above described home network or foreign network may be one composed of the local network and an upper level network connected with the local network at a lower level. Such an upper level network is called a regional network for convenience. FIG. 4 shows an aspect of a three-layer structure where the regional network is connected at a lower level of the global network, and the local network is connected at a lower level of the regional network.

In the present invention, "the global network" means a network which is connected with the regional network at a lower level; "the local network" means a network where a terminal node is connected and configures the lowest level in a communication network; and "the regional network" means a network present between the global network and the local network. For example, as "the global network", a backbone network connecting to a telephone line and an Internet provider in a worldwide way can be exemplified; as "the regional network", a telephone line limited to domestic or regional connection, or the Internet provider network can be exemplified; and as "the local network", a network of an enterprise, a home or special project can be exemplified. The node can connect directly also to any of the global network, the regional network and the local network. In FIG. 4, a node X is directly connected to the global network; a node 11 is connected to a regional network 1 which connects at a lower level of the global network; and a node 1 is connected to the local network 1 which connects at a lower level of the above regional network. It should be noted that the regional network is an exemplification for explaining a layer configuration, and application etc. is not limited to the above name, as long as it is a network formed between the global network and the local network.

Figure 5:
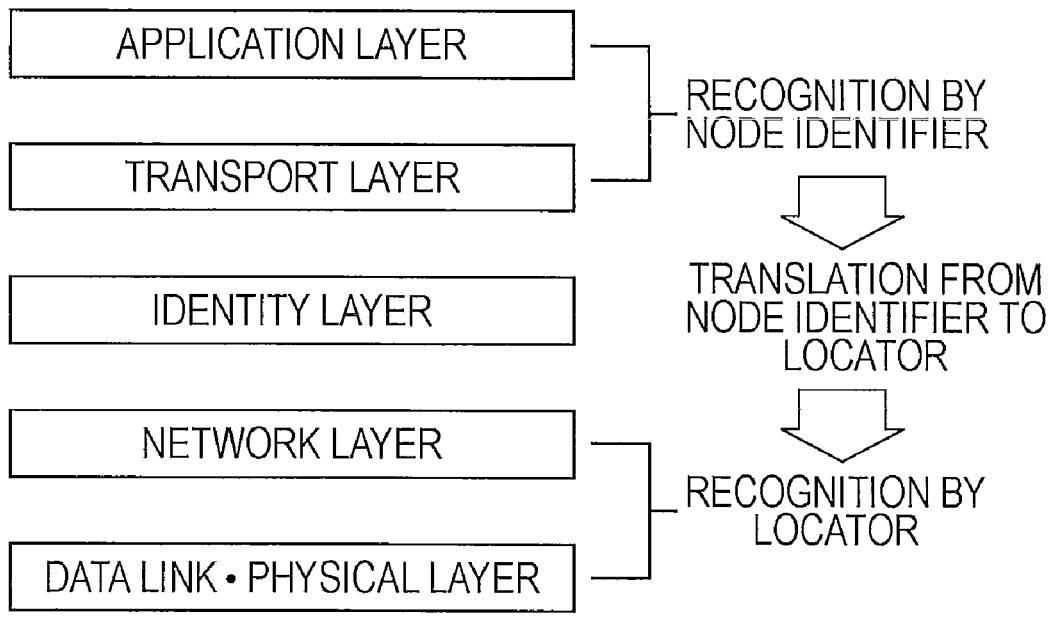
FIG. 5 is a drawing for explaining a network protocol layer of the communication method of the present invention.

In the present invention, by forming a hierarchy structure by classifying a communication network into multi-layers in this way, and using the locator for specifying the presence of the node in each of the networks, end-to-end communication between the nodes becomes possible. Further, because the packet communication method can be changed in each layer, a different communication system can be introduced into every layer. It should be noted that the regional network may be a mono-layer as shown in FIG. 4, however, as shown in FIG. 5 to be described later, it may be one configuring two-layers of a regional network X and a regional network Y, or a multi-layer of three or more layers.

(i) A Node

In the present invention, the node is a device which can connect to a network, and perform communication via packet transmission and receiving. Therefore, an electric appliance such as a TV, or a video; a device bearing a communication function of a network such as a GW, a router or a server; a device to be used exclusively for information supply such as a sensor, in addition to a mobile communication device such as a mobile phone, a PC or a PDA, can be a node. The node is not especially limited, in particular on a configuration thereof, as long as it has function to be able to communicate via packet transmission and receiving, and packet communication may be performed with wireless or with cable. In addition, it is not especially limited to end-to-end communication, as long as communication is possible by a packet at least partially between the nodes. Therefore, it can be used suitably for a sensor node where end-to-end communications is difficult. It should be noted that the present invention is one proposing a novel communication method for a packet, and the content of the packet is not especially limited. Therefore, it is not limited to the case where voice information is communicated by a packet, such as an IP telephone, but can use image information, character information and other information, as packet content.

In the present invention, each node has a node name, and the node name thereof is stored or registered in the identity server (H-IS) of a network. A network managed by the identity server, which has stored or registered the node name, is a home network of the relevant node, and the node name is specified uniquely in the home network. As a node name, one related to applications can be used, for example, "pc" for a personal computer, "tv" for a television, "vcr" for video cassette recorder, or "phone" for a telephone, and the like. The node name may include a dot ".", and names such as, for example, "my.pc" or "mobile. phone" can also be used. Because a name related to function thereof can be bestowed to the node, management of the node can be performed easily. In the present invention, because a unique node name can be used in the home network, it is convenient for packet communication, mainly in a narrow range, like a device such as a sensor or an electric appliance. Because these devices are compact-types, when they can be specified by a short and brief name, it is advantageous in selection of name space in communication.

The node name is unique in the home network, however, uniqueness is not required in the global network composed of the home network and one or more foreign networks. Therefore, there may be present a node having the same node name in the home network and the foreign network. It should be noted that, as will be described later, node names of the H-IS and F-IS should have uniqueness globally.

(ii) An Identity Server

The identity server to be used in the present invention stores a bundle of the locators. It should be noted that, in the present specification, the identity server which manages the home network is referred to as the H-IS; and the identity server which manages the foreign network is referred to as the F-IS. As will be described later, the locator is assigned from the H-IS to the relevant node, by request from the node.

In the present invention, in the case where the node name of the node is confirmed the uniqueness in the home network, the H-IS allows use of the relevant node name to the node, as well as allows use of the node identifier composed of the node name and the H-IS name to the relevant node. Next, the H-IS stores the node name and the node identifier of the node. It should be noted that the H-IS, in storing the node name, acquires other verification information and others from the node, and may store these together. In the present invention, as will be described later, the node identifier composed of the node name and the H-IS name may be used, after converting it to a parameter-dependent-type bit stream, by intervening further other parameters. Therefore, as other information, which the H-IS stores, parameters to be intervened in the node identifier, or information on a management method about such parameters can be exemplified. In the case where the above described parameters are those made by a cryptographic hash function, a list of the hash functions can be included. In addition, in the case where a plurality of node identifiers with different parameters is used, they can also be stored by specifying a rewriting algorism of the node identifier.

In the case where assignment of the locator is requested by presenting the node identifier, the H-IS selects the locator to be assigned to the node, and if needed, memorizes or stores it, corresponding to the node, together with other verification information or the list of the hash functions and the like, and provides the information to the GW and the like.

In the present invention, both the H-IS and the F-IS are a kind of the node and specified by node names. The node names of the H-IS and the F-IS are unique globally, like the DNS name. It is because, in the case where the H-IS name or the F-IS name is described as an address of a destination or a home, the relevant packet is transmitted and received to the identity server thereof. It should be noted that selection of such a globally unique name can be attained by selection of one name from the names stored in advance by an administrator.

(iii) A Gateway (GW)

The GW is arranged in all of the home networks and foreign networks. The node of the home network can communicate with the node belonging to any of the foreign networks other than the home network via the GW. In addition, the GW can memorize or store mapping of the identity information and the locator of the node. Memorizing or storing of this mapping by the GW makes it possible to change an address of a packet header transmitted to the GW, based on this mapping.

It should be noted that the GW is present at the boundary of an access site of a network domain, and can exchange information of the bundle of the locators usable by communication with the H-IS. In addition, if needed, in order to make a network transparent, it is possible to overwrite a header for packet routing. The GW can cooperate with the H-IS to exchange usable locator information, or acquire, memorize and store a corresponding mapping of the node identifier and the locator.

In the packet communication method of the present invention, it is necessary for the GW itself to be assigned with the locator necessary for routing, to perform routing of a packet by the GW. As shown in the FIG. 4, in the case where a communication network forms a hierarchy structure, the locator of the node also takes a hierarchy structure. Therefore, it is necessary that the GW participating in routing of the node is also assigned with the locator having a hierarchy structure. For example, as described in FIG. 4, three kinds of the locators, a local locator GL1, a regional locator RL1 and a global locator LL1, are assigned to the node 1 having a connection of the global network→the regional network 1→the local network 1, respectively. That is, in order to perform routing of a node A in the above network with a three-hierarchy structure, the GW is assigned with the three kinds of the locators composed of the local locator, the regional locator and the global locator.

(iv) A DNS

In the present invention, the DNS may take charge of function for memorizing the node identifier and the locator corresponding to the node name. In this case, the DSN itself becomes the H-IS or the F-IS. It is possible to acquire the node identifier or the locator of the node, based on the node name, via the DSN, so as to function as a mapping agent for mapping the node name, the node identifier, the locator and other verification information. In addition, also in the case where a node name shorter than the node identifier is used by having the DNS stored the node identifier and the node name, as a pair, a corresponding node identifier or a locator can be specified easily by the DSN, and a packet header size can be made compact.

(2) A Network Protocol Layer

Features of the present invention are in that the node identifier is used as a packet address, the node identifier is converted to the locator of the node, during packet communication, and then the routing of packet is performed based on the locator. In this way, it becomes possible to separate roles of the node identifier and the locator, and localize effect thereof in the network protocol layer. It differs from that a conventional IP address is used in both of the node identifier and location information.

In order to make understanding of the communication method of the present invention easy, explanation will be given by introducing a concept of the generic identity layer to a network protocol layer, as a new protocol layer.

As shown in FIG. 5, the concept of the protocol layer in the present invention is configured by an application layer, a transport layer, a generic identity layer (hereafter referred to simply as an identity layer), a network layer, a data-link layer, and a physical layer. A node is identified by using the node identifier in the application layer and the transport layer; mapping of the node identifier and the locator is performed in the identity layer; and packet transmission is performed in the network layer or at the lower level layer, based on the locator. It should be noted that, in FIG. 5, the identity layer was formed between the transport layer and the network layer, however, it is an exemplification, and the identity layer may be formed between the application layer and the transport layer, if mapping of the node identifier and the locator can be performed. In addition, "the identity layer" is one inserted for understanding the present invention, and presence of such a separate layer is not necessary, if mapping of the node identifier and the locator can be performed substantially.

Translation from the node identifier to the locator, which is performed in the identity layer, is composed of:

(A) a step for acquiring the locator of the home node, and a mapping table of the node identifier and the locator of the relevant node, by presenting the node name or the node identifier to the H-IS or the F-IS;

(B) a step for acquiring the locator of a destination node, and a mapping table of the node identifier and the locator of the relevant node, by making inquiry to the H-IS; and (C) a step for rewriting the node identifier of a packet to the locator, based on the above mapping table.

A data packet including a payload is subjected to the routing, based on this locator.

(3) A Node Identifier

The node identifier is not especially limited, as long as it can specify the node in application, however, one obtained by connecting "the node name" and "the H-IS name" via a connector can be used suitably. The connector is not especially limited, however, "#" is suitable. It is because "#" can separate the node name and the H-IS name simply from the node identifier, by a name resolver. For example, in the case where the node name is "my.pc" and the H-IS name is "mynetwork.com" and the connector is "#", the node identifier becomes "my.pc#mynetwork.com". As described above, because the H-IS name has global uniqueness, the node identifier also has global uniqueness.

Because the node identifier to be used in the present invention contains the node name and the H-IS name, the H-IS of the relevant node, that is, a home network belonging to the relevant node, can be known easily from the node identifier. It should be noted that such a node identifier may be configured by a bit stream.

Figure 6:
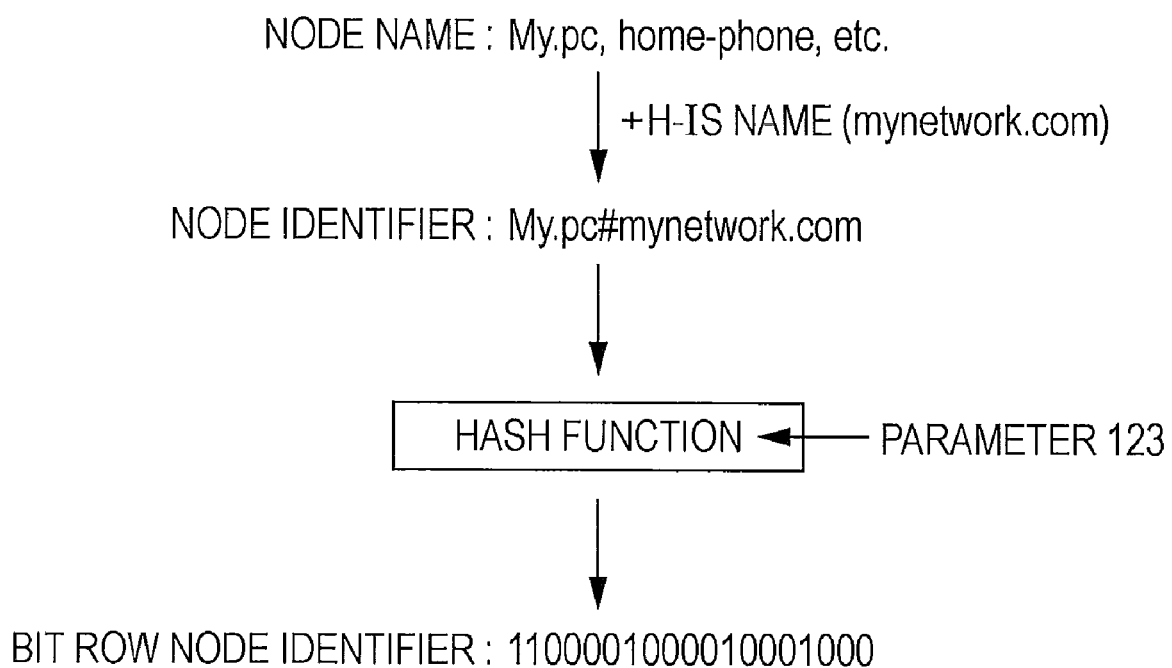
FIG. 6 is a drawing for explaining a generation method for a bit stream node identifier by introducing a parameter, using a hash function from the node identifier in the present invention.

Further, the node identifier to be used in the present invention may convert the above node identifier to a corresponding bid row, by intervening other parameters. As a generation method for such a bit stream, there is a cryptographic Hash function, such as SHA1 (National Institute of Standards and Technology, "Ensure Hash Standard", FIPS PUB 180-1, April 1995, http://www.itl.nist.gov/fipspubs/fip180-1.htm), or MD5 (R. Rivest, "The MD5 message digest algorithm," RFC 1321, April 1992). A conversion method used the hash function is shown in FIG. 6. In FIG. 6, in the case where the node name is my.pc, the H-IS name is mynetwork.com, and the node identifier is my.pc#mynetwork.com, and in the case where 123 is introduced as a parameter to the Hash function, "110000100001000100" is calculated, and the case where this is used as the node identifier is shown. The node identifier composed of such a bit stream is called "a bit stream node identifier". By introducing the hash function, and by introducing the different parameters, a plurality of bit stream node identifier can be acquired for one node name. This means that a plurality of node identifier generates for one node name, and in this way, a user can use a different node identifier corresponding to a session.

Further, in the present invention, in the case where two node identifiers, ID1 and ID 2, were acquired by introducing two parameters to the hash function, packet communication can be performed by using ID1 as an address in the transport layer, by rewriting ID1 to ID2 in the identity layer, and then by rewriting ID2 to the locator. A bit stream, which is a bit stream node identifier obtained by introducing the hash function, and can be rewritten with the locator, is called an "aID", and one to be used in advance of the aID is called a "pID" for convenience. By rewriting from the pID to the aID during communication, the pID is not actualized, and thus privacy can be ensured.

(4) A Locator

The locator is information for arriving at the present location of the node, and is used for routing of a data packet. In the present invention, it is necessary that the node acquires locators of own and the destination node for communication of a data packet, however, the locator is one with short life, which changes according to mobile communication or network policy. The locator is one having global or local uniqueness, corresponding to request from the node, network capacity, or application requirement conditions.

In the present invention, the locator is specified every network where the node is connected. For example, as shown in FIG. 3, in the case where a communication network is configured by two hierarchies of the global network and the local network connecting to the global network, and the node 1 is connected to a local network 1, the locator of the node 1 is configured by the global locator GL1 and the local locator LL1. In the case where a communication network has a two-layer structure of the global network and the local network, the global locator specifies arrival information of the local network connecting at the lower level of the global network, and the local locator specifies arrival information of the node 1 in the local network 1.

In addition, as shown in FIG. 4, in the case where a network, which is connected with a node, is configured by three layers of the global network, the regional network and the local network, the locator also configures a hierarchy structure correspondingly, and arrival information is specified by the global locator, the regional locator and the local locator. Specifically, a node X directly connecting to the global network, is specified by the global locator GLx, as for a route thereof; a node 11 connecting to the regional network is specified by the global locator GL1 and the regional locator RL1, as for a route thereof; and a node 1 connecting to the local network is specified by the global locator GL1, the regional locator RL1 and the local locator LL1, as for a route thereof. That is, in the present invention, "the global locator" is one which provides location information of the node in the global network. The global locator is unique in the global network. Similarly, "the regional locator" is one which provides location information of the node in the regional network; and similarly the local locator is one which provides information in the local network, and any of them is unique in the network thereof. In FIG. 4, Loc={GLx} shows the locator of the node X, Loc={GL1, RL1} shows the locator of the node 11, and Loc={GL1, RL1, LL1} shows the locator of the node 1.

It should be noted that a gateway installed between networks is also a node, and is assigned with the locator. In addition, the identity server (H-IS or F-IS) or a DNS of each network is also a node, and is assigned with the locator of a necessary hierarchy, corresponding to the global network, the regional network, the local network etc., connected with these. To the GWs between the global network and the regional network 3, the global locator GL3 is assigned.

It should be noted that the global locator or the regional locator may be used with sharing. For example, the locator of the node 3 of FIG. 4 is Loc={GL3, RL3, LL3}, the locator of the node 4 is Loc={GL3, RL3, LL31}, and the global locator GL3 and the regional locator RL3 are commonly shared by the node 3 and the node 4. There is features in that the number of the global locators can be reduced, in this way, by forming hierarchy in a communication network, by forming the regional network at the lower level of the global network, and configuring the local network at still lower level thereof; by forming hierarchy in the locator corresponding to the network of each hierarchy; and by sharing use of the global locator or the regional locator.

It should be noted that, in the case where the communication network of the present invention has many global locators, as shown in the node X, one global locator can be assigned to one node. In this case, the node is not required to be assigned with the regional locator or the local locator.

In the packet communication method of the present invention, a data packet, where a predetermined locator is described as a packet destination, is subjected to routing via the GW belonging to the global locator thereof.

Further, in the present invention, packet routing can be performed by considering the node identifier of the H-IS as the locator of the H-IS. Because the H-IS name is specified in the node identifier, and the H-IS name is globally unique, the H-IS name or the node identifier of the H-IS can be used as the locator, by making the H-IS name or the node identifier of the H-IS corresponded to the locator of the H-IS, in advance. In the present invention, this is called "a reference locator". The reference locator is a more permanent or additional locator as compared with other locators. It should be noted that only the node identifiers of the H-IS and F-IS are qualified to become the reference locator. By using the reference locator, inquiry to the DNS to acquire the locator becomes unnecessary, and the step for acquiring the locator can be simplified. It is because the locator other than the reference locator is one which shows actual location information of the node, and changes when the node moves to a new network, however, such change is absent or less in the reference locator.

The locator is not especially limited. For example, the present IPv4 or IPv6, upper 64 bits of the address of the IPv6 showing the location information, and others can be exemplified.

It should be noted that the node can use the global locator for a period of time allowed by the H-IS.

(5) A Node Identifier/Locator Separation Protocol

In the present invention, concept of the new identity layer is introduced to the conventional network protocol layer, so as to transmit a packet by using the node identifier and the locator.

The data packet is added with a packet header sequentially when the packet is transmitted from the application layer toward the physical layer, and is sent to the next layer. In the present invention, in the application layer and the transport layer, the packet is transmitted, using the globally unique node identifier as an address, and the routing of packet is performed, using the locator as an address, in the network layer or in the lower level layer.

Explanation will be given below on packet routing, where the bit stream node identifiers, "the pID" and "the aID", acquired by introducing different parameters to the hash function, are used, as the node identifier, and the aID is rewritten to the locator, after changing the pID to the aID in the identity layer. It should be noted that, in the present invention, layers other than the network protocol layer are assumed to be able to use function of a conventionally known each layer.

Figure 7:
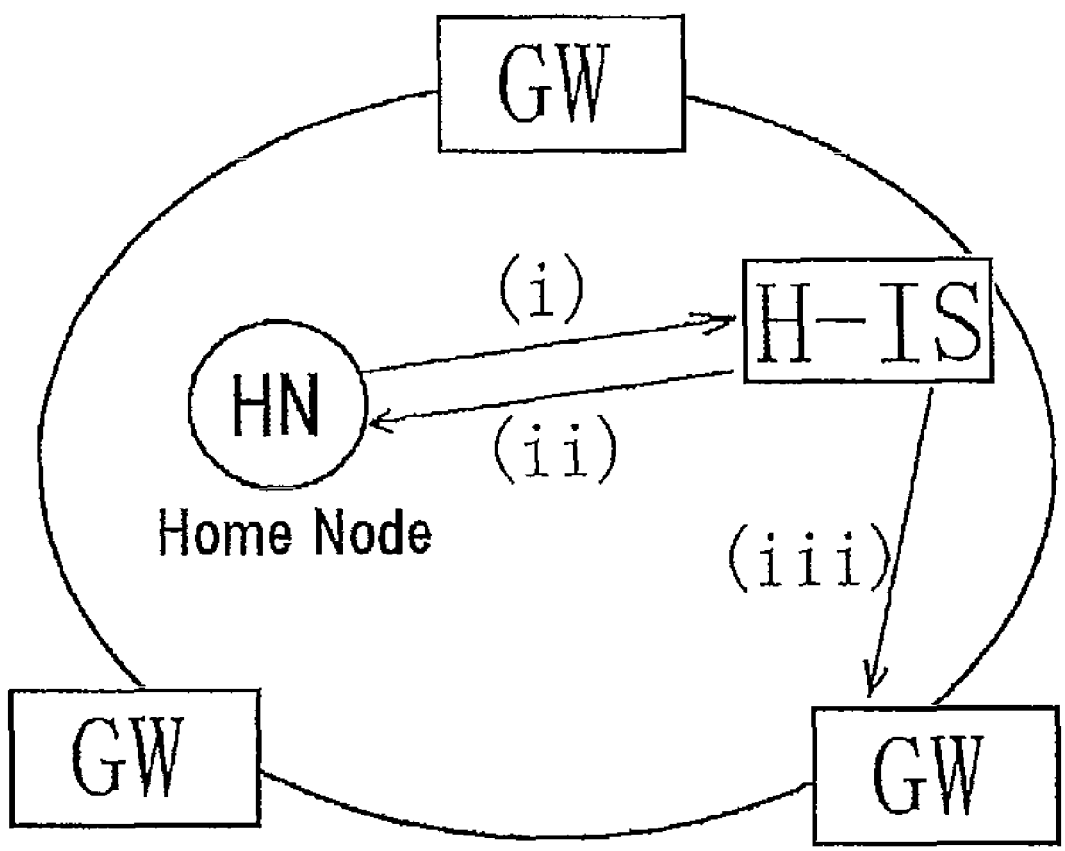
FIG. 7 is a drawing for explaining a method for acquiring a locator in a home network, in the communication method of the present invention.
Figure 9:
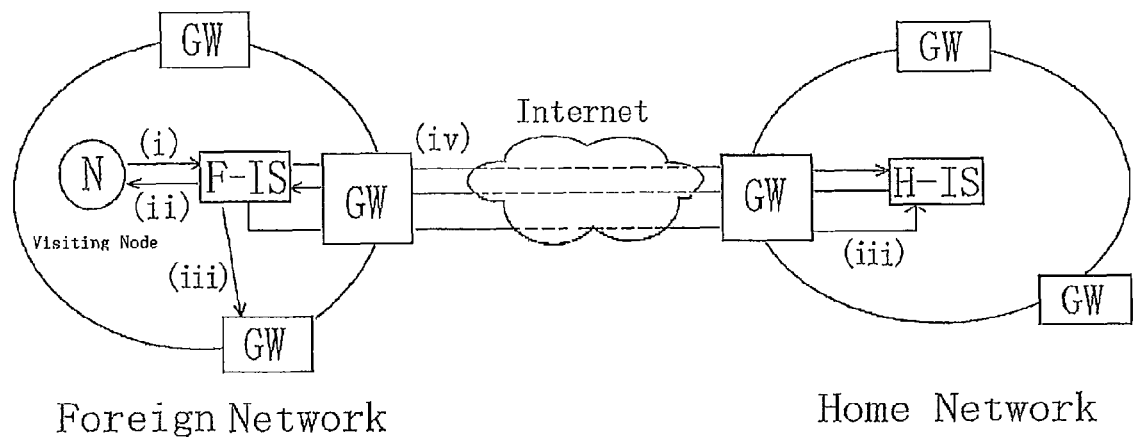
FIG. 9 is a drawing for explaining a method for acquiring a locator in a foreign network, in the communication method of the present invention.

Signaling messages in the present invention are as follows:
(i) Locator assignment request (LocAssignReq): It is sent from the home node to the H-IS or the F-IS to acquire the locator.
(ii) Locator assignment report (LocAssignRep): It is sent from the H-IS or the F-IS to the node, to report the locator assigned to the home node.
(iii) Mapping information of the node identifier and the locator (LocAssignInfo): It is sent from the F-IS to the H-IS, or from H-IS or the F-IS to the gateway to inform mapping of the home node identifier and the locator.
(iv) Assignment verification request (LocAssignReq Verify): It is sent from the F-IS to the H-IS to verify locator assignment request (LocAssignReq) from the visiting node.
(v) Locator resolution request (ID ResolutionRequest): It is sent to the home identity server (dH-IS) of the destination node to request resolution of the locator corresponding to the node identifier of the destination node.
(vi) Locator resolution response (ID ResolutionResponse): It is sent to relating nodes to respond mapping information etc. on the destination node identifier and the locator of the destination assigned by the identity server (dH-IS) of the destination node.
(vii) Communication initialization request (CommInitializationRequest): It is transmitted from the home node to the destination node to notify communication condition of the home node to the destination node.
(Viii) Communication initialization response (CommInitializationResponse): It is transmitted from the destination node to the destination node to notify the pID, the aID, the locator, a list of the hash functions, the aID update algorism etc. of the destination node.
(ix) Communication Initialization Completion response (CommInitializationComplete): It is transmitted from the home node to the destination node to notify that communication has become possible under communication condition of the destination node.
(A) Acquisition of the Locator of the Home Node In the present invention, the locator is acquired for the node to connect to a network. Explanation will be given on the method for acquiring the own locator by the home node, by classifying into the case where the node is present in the home network (FIG. 7), and the case where it is present in the foreign network (FIG. 9).
(A-1) Acquisition of a Locator in the Home Network
(i) The node (N) requests assignment of the locator by presenting the own node identifier to the H-IS (LocAssignReq). In the locator assignment request, the aID and other special verification information for verification, in addition to the node identifier, can be included. By performing verification of the node prior to the locator assignment request, security of communication can be enhanced.
(ii) H-IS, for example, as shown in FIG. 8, can store the node identifier corresponding to the node name (my.pc), (my.pc#mynetwork.com), the aID, the pID, the locator, kind of the hash function, parameters, other verification information and the like. The H-IS, which received the locator assignment request (LocAssignReq), reports the locator assignment (LocAssignRep) including the above content to the node, after specifying the node name (my.pc), the bit stream node identifier (aID), the locators (GLoc11, RLoc12, LLoc13), and used hours information of the locator etc. It should be noted that, in the case where verification by the special verification information is not performed, operation can be terminated without assignment of the locator.
(iii) In addition, the H-IS transmits, at the same time of the locator assignment Report (LocAssignRep) to the node, mapping information including the node identifier (aID) and the locators (GLoc11, RLoc12, LLoc13) of the node thereof, together with information on used hours of the locator, to the GW, where the global locator, which is assigned by the H-IS in the locator assignment report, is assigned to an interface (LocAssignInfo). Any of the GWs can handle only sending and receiving of a packet, where the own locator is described in the packet header.
(A-2) Acquisition of the Locator in the Foreign Network Description will be given below in the order of transmission and receiving of a signaling message, and not in the order of the above signaling number. It should be noted that (i) to (iv) are number of the signaling messages.
(i) A node (N) present in the foreign network requests assignment of the locator corresponding to the own node identifier to the F-IS (LocAssignReq). In the locator assignment request, the aID and other special verification information for verification in addition to the node identifier can be included. By performing the verification of the node, prior to the locator assignment request, security of communication can be enhanced.
(iv) Because the F-IS cannot verify the special verification information of the visiting node (N), it analyzes the node identifier included in the locator assignment request, and specifies the H-IS of the home network of the node thereof to request assignment verification to the relevant H-IS (LocAssignReq Verify). The F-IS can perform the above forwarding by rewriting the destination address of the packet from the F-IS node identifier to the H-IS node identifier. This packet arrives at the GW of the home network, through the GW of the foreign network and via the Internet, and is then transmitted to the H-IS. It should be noted that the F-IS can specify the H-IS easily by analyzing the H-IS name included in the node identifier. The H-IS, which received the forwarded assignment verification request, verifies the relevant node by the special verification information described in the packet, and reports the verification to the F-IS. It should be noted that, in the case where verification by the special verification information is not performed, operation can be terminated without assigning the locator.
(ii) The F-IS, in receiving the verification by the H-IS, assigns the locator to the node, and reports the locator assignment to the relevant node, together with the node identifier, the bit stream node identifier "aID", used hours information of the locator and the like (LocAssignRep).
(iii) In addition, the F-IS transmits mapping (LocAssignInfo) of the node identifier and the locator of the node thereof to the relating GWs and reports it to the H-IS, at the same time of the locator assignment report (LocAssignRep) to the node. The report packet from the F-IS to the H-IS arrives at the GW of the home network, through the GW of the foreign network and via the global network such as the Internet, and is then transmitted to the H-IS. It should be noted that the relating GWs are GWs where the global locator assigned by the F-IS is assigned to an interface.

The H-IS, which received corresponding information of the node identifier and the locator, stores the locator assigned to the node, and the locator of the F-IS, as the locator and the reference locator, respectively. In this way, for example, even in the case where actual location of the node changed in a relatively short time, the node can connect to the locator of the F-IS. In addition, by transmission to the H-IS, the H-IS can always know the locator of the node belonging to the home network.

It should be noted that a message such as the locator assignment request (LocAssignReq) including network information such as the server name, the locator of the GW, is broadcast. In the case where an identity server name described in the message is not the identity server (H-IS) name of the home network of the node thereof, it can be known that the node thereof exists in the foreign network. When the visiting node sends the locator assignment request (LocAssignReq) to a neighboring GW, the GW forwards it to the F-IS, and the visiting node can contact with the F-IS via the GW.

(B) Acquisition of the Locator of the Destination Node (v) The node, which received the above locator assignment report (LocAssignRep), transmits the locator resolution request (ID ResolutionReq) corresponding to the node identifier of the destination, to the H-IS or the F-IS, where the locator assignment (LocAssignRep) was reported.

(vi) In the case where the H-IS or the F-IS, which received the locator assignment request, confirmed that the relevant node belongs to the own network from the node identifier of the destination, it bestows the locator to a node specified by the node identifier, and reports mapping of the node identifier and the locator to the GW, where this locator (the global locator or the local locator) is assigned to an interface (ID ResolutionRes).

In addition, in the case where the H-IS or the F-IS, which received the locator assignment request (ID ResolutionReq), has not registered the destination node, it specifies the identity server (dH-IS) of the home network of the destination node from the node identifier, and forwards the locator resolution request (ID ResolutionReq). The forwarding can be performed by address rewriting.

The identity server (dH-IS) of the home network of this destination node, similarly as the above H-IS, bestows the locator to the node specified by this node identifier, and reports the mapping of the node identifier and the locator to the GW, where this locator is assigned to an interface, (ID ResolutionRes).

According to the above, even in the case where the node is present in the home network or in the case where the node is present in the foreign network, the locator of the destination node can be acquired by presenting the node identifier of the destination node to the dH-IS.

It should be noted that the above signaling messages, from (i) to (iv), are performed by a control packet. FIG. 10 shows contents of these control packets.

(C) Packet Communication Between the Nodes (C-1) Signaling Message

Figure 11:
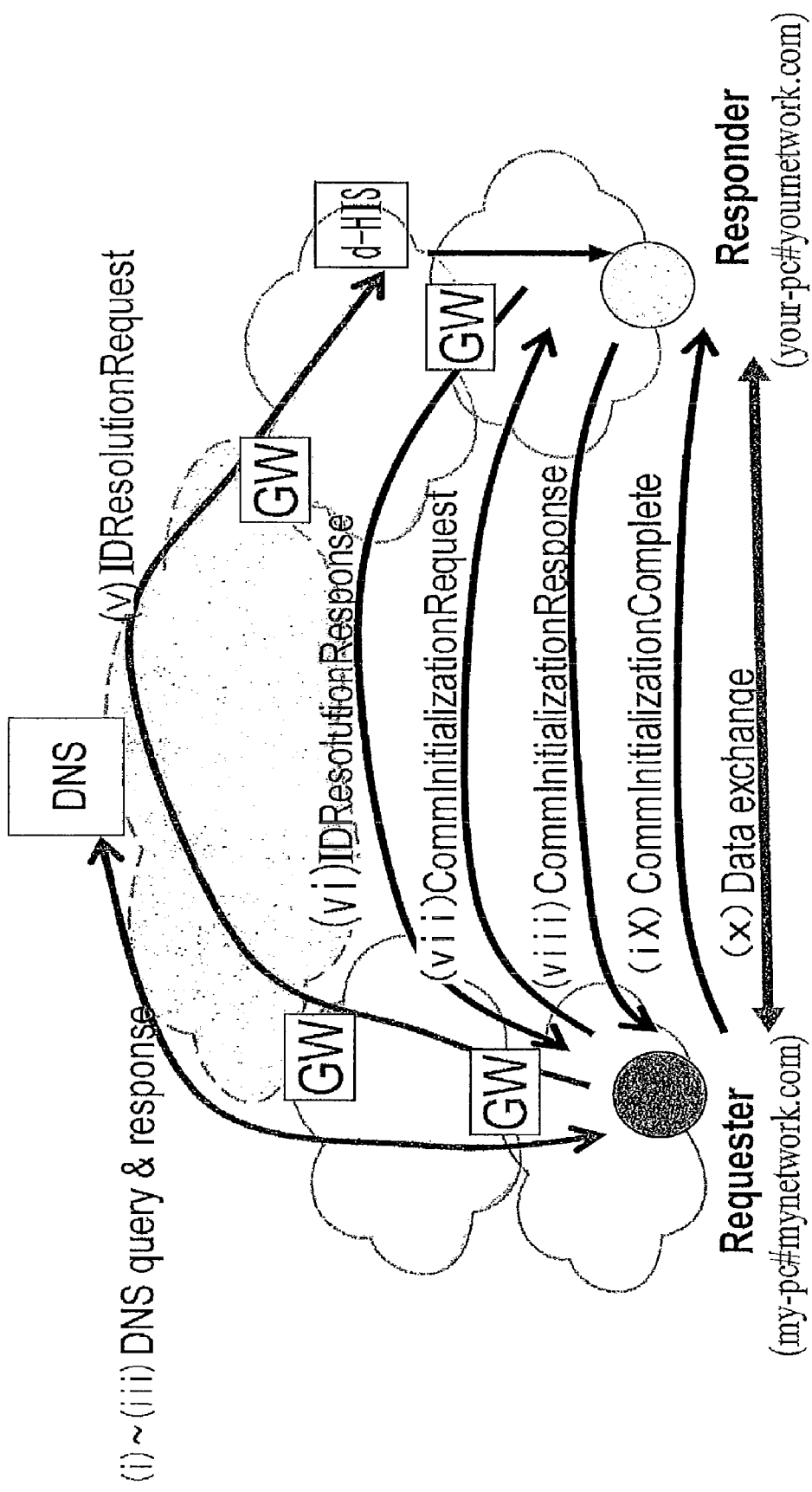
FIG. 11 is a drawing for explaining a method for performing the signaling messages of the communication method of the present invention, between a home node and a destination node.

As described above, in the present invention, the node, without regard to presence in the home network or presence in the foreign network, can acquire locators of own and other nodes by presenting the node identifier. Next, explanation will be given on outline of performing the signaling messages, between the home node and the destination node, instead of the home node and the foreign node, with reference to FIG. 11. It should be noted that, in FIG. 11, explanation will be given by setting a Requester as a home node, a node identifier thereof as my-pc#mynetwork.com, the Responder as a home node, and the node identifier thereof as your-pc#yournetwork.com.

(i) to (iii) The home node transmits the locator assignment request (LocAssignReq) and the locator assignment report (LocAssignRep) to the DNS, the H-IS, the F-IS to acquire the locator of the home node. Then, the destination node acquires the locator of the H-IS of the destination node from the DNS and other servers, by the H-IS name (yournetwork.com) of the node identifier of the destination node (your-pc#youtrnetwork.com).

(v) The home node (my-pc#mynetwork.com) transmits the locator resolution request (ID ResolutionReq) to the identity server (dH-IS) of the destination node. The identity server (dH-IS) of the destination node resolves the node identifier of the destination node from the mapping table of the name, the node identifier, and the locator of the destination node. The dH-IS transmits this answer to the destination node without answering to the home node. By the forwarding to the destination node, load of the dH-IS can be reduced. It should be noted that, different from FIG. 10, direct answering may be allowed from the dH-IS to the home node.

(vi) The destination node, which was forwarded the locator resolution request (ID ResolutionReq), prepares the locator resolution response (ID ResolutionRes) including the information such as the node identifier, the aID, the locator, and transmits it to the home node. In this locator resolution response (ID ResolutionRes), further, type of the hash function or parameters to be used can be included. In the case where the destination node has many locators or a plurality of node identifier for multi-homing etc., the destination node can select the locator or the node identifier to be used for this communication.

(vii) The home node verifies the node identifier of the destination node by using the information included in the locator resolution response (ID ResolutionRes), and transmits the communication initialization request (CommInitializationReq). In the communication initialization request (CommInitializationReq), the node identifier of the destination, the node identifier of the home, the pID of the home node, the aID of the destination node, parameters, the locator, a list of the hash functions, ID update algorism and the like can be included. It should be noted that the list of the hash functions is used to rewrite the aID of the header the of the identity layer in progress of communication.

(viii) The destination node verifies the node identifier of the home node by utilization of information included in the communication initialization request, and then selects the node identifier update algorism and the hash function from the list included in the communication initialization request. The destination node prepares the communication initialization response (CommInitializationRes) including the node identifiers of the home node and the home node, the pID and the aID of the destination node, the locator, the list of the hash functions, update algorism and the like, and transmits it to the destination node.

(ix) The destination node, in receiving the communication initialization response, stores the names of the home node and the destination node, the node identifier, the locator, the hash function selected, and tag update algorism, as communication condition. Then, the communication initialization completion response (CommInitializationComplete) including the above communication condition is transmitted to the destination node.

(x) According to the above process, packet communication can be initialized between the home node and the destination node.

It should be noted that the above signaling messages (v) to (ix) are performed by a signaling message transport protocol control between the application layer and the identity layer. FIG. 12 shows contents of these control packets.

(C-2) Rewriting from the Node Identifier to the Locator

Figure 13:
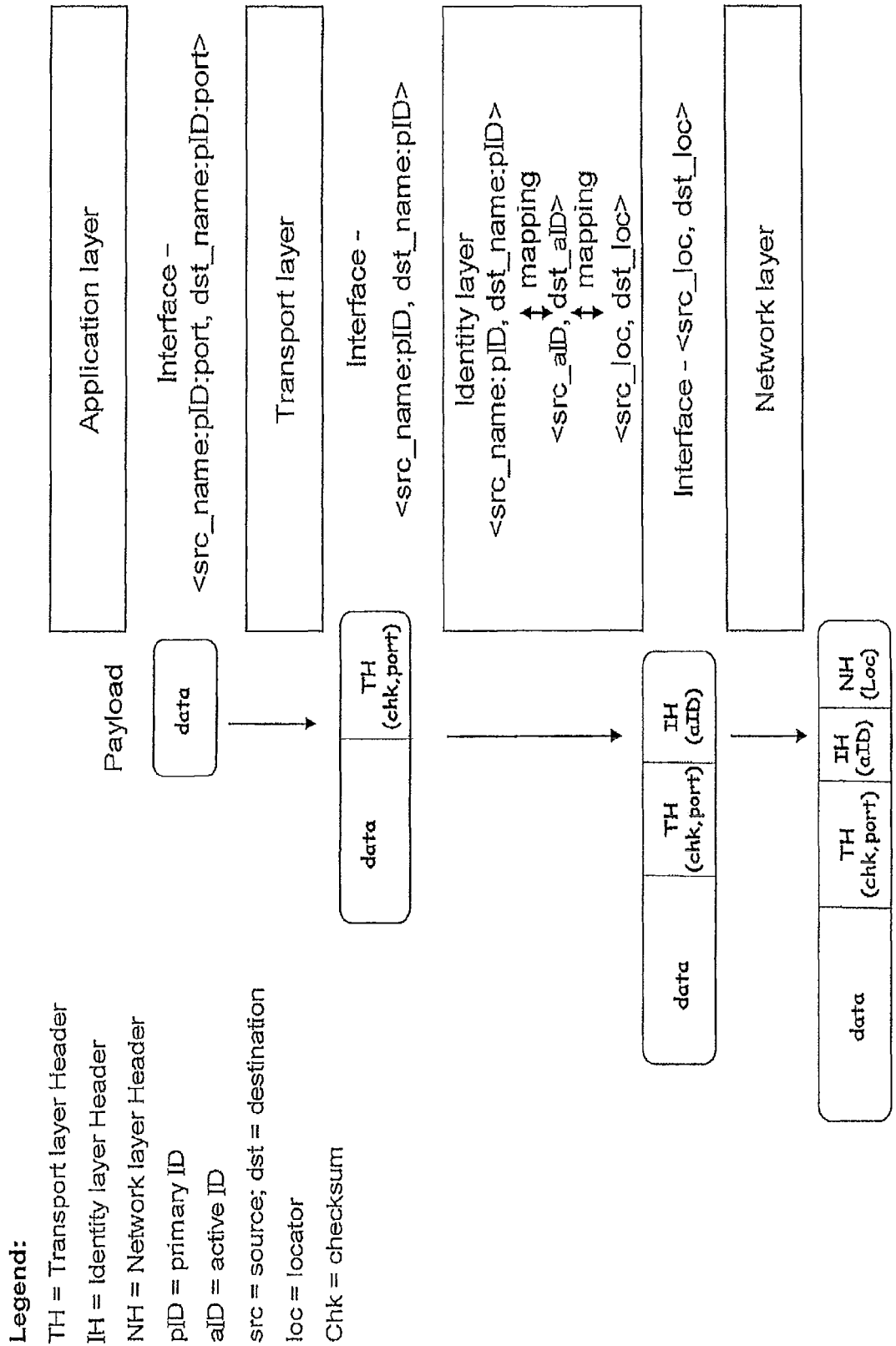
FIG. 13 is a drawing for explaining a method for acquiring a pID and an aID by an identity layer of a node.

In the present invention, after the communication initialization completion response (CommInitializationComplete) is transmitted from the above home node, data packet communication between the home node and the destination node can be performed. In the present invention, features are in that a data packet having the node identifier as an address is rewritten from the node identifier to the locator in the identity layer, and routing is performed according to the locator. Explanation will be given below on a method for acquiring the pID, and the aID by the identity layer of the node, with reference to FIG. 13.

The above signaling messages (v) to (ix) are performed between the application layer and the transport layer. When the application layer of the destination node sends the locator resolution request (ID ResolutionRequest) to the identity layer, the identity layer introduces a different parameter to the node identifier, and can acquire the bit stream node identifiers named the pID and the aID. In the case where the identity layer already has a plurality of bit stream node identifier, any of them may be used as the pID, and the other as the aID. The identity layer performs the above signaling messages (v) to (ix) by using these identifiers.

After a communication initiation state is attained by the communication initialization completion response (CommInitializationComplete), the application of the home node prepares a data packet including a payload, and sends it to the transport layer via an interface specified by the node names of the home node and the destination node, the pID and the port number of the transport.

In the transport layer, because an address has been specified by the node identifier (pID), the TCP checksum is performed on this node identifier (pID). The transport layer forms a packet including a transport header in the payload. In the transport header, the checksum and the port number are described.

Next, the transport layer sends this packet to the identity layer via an interface specified by the node names, and the pIDs of the home node and the destination node. The identity layer prepares an identity header including the home aID and the destination aID, and adds it to the packet. The identity layer of the home node has stored mapping information on the aID, the pID and the locator, by the above signaling messages. Therefore, the identity layer performs mapping to the aID of the pIDs of the home and the destination nodes, based on this mapping information, and rewrites this aID to corresponding locator.

Next, the identity layer transmits a packet to a network layer, where the destination node and the home node have been specified by their locators.

The network layer adds the network header including the locator to this packet, and forwards this packet to the data link layer and the physical layer at the further lower layer.

Figure 14:
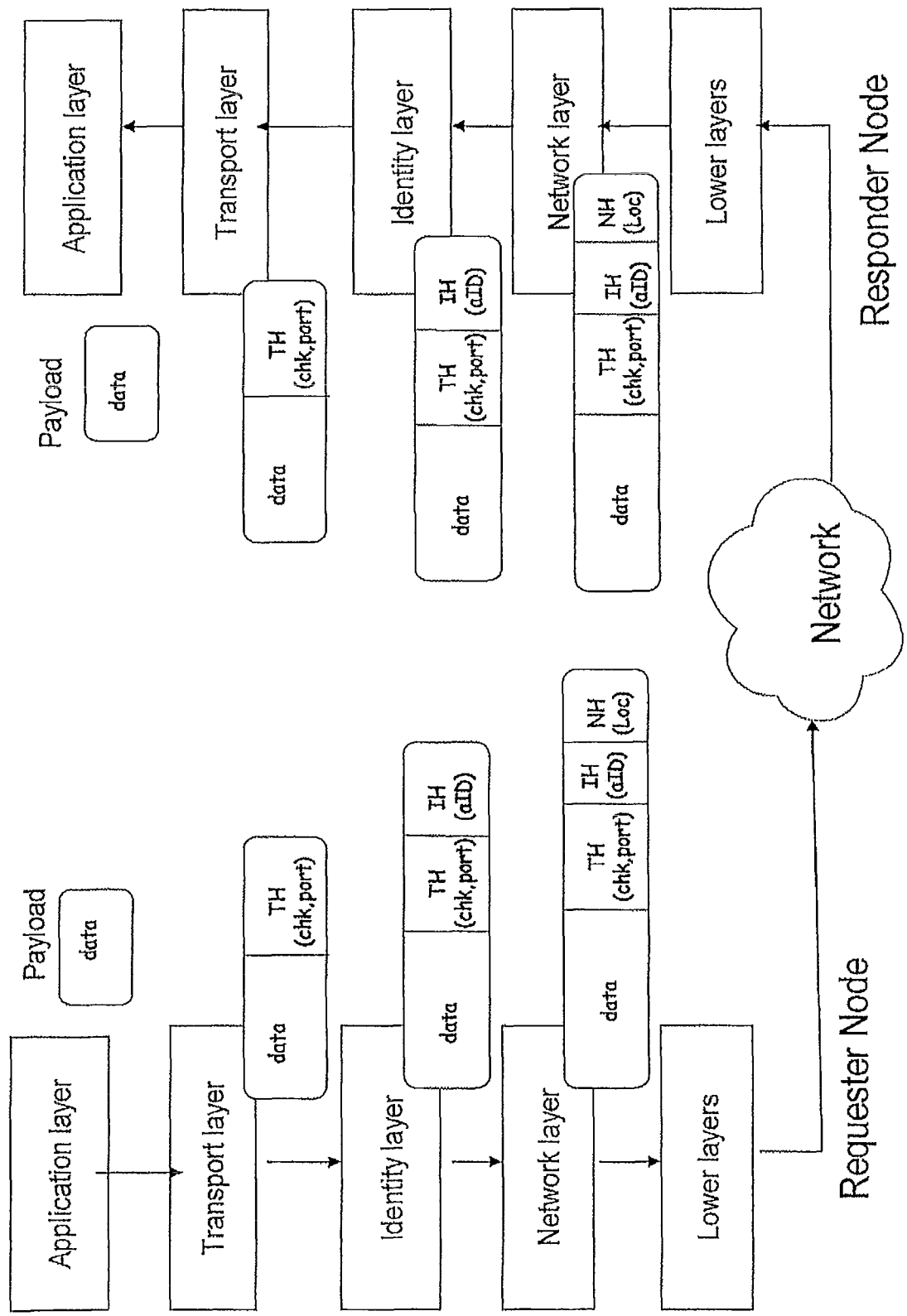
FIG. 14 is a drawing for explaining a method for preparation and dispatching a data packet at a home node, a routing in a network, and a process from arriving of this data packet at the destination node to arriving at an application layer.

Next, explanation will be given on packet transmission and receiving between the home node and the destination node, with reference to FIG. 14.

In the present invention, by the above signaling message, H-IS, F-IS and GW have stored the node identifier of the home node, the node identifier of the destination node, the locator of the home node, the locator of the destination node, and correspondence between the node identifier and the locator of the home node, and mapping of the node identifier and the locator of the destination node relating to packet routing.

It should be noted that, in the present invention, such information is called a routing table. Therefore, the packet is checked on the locator of the network header of the packet in the GW of a communication network, and forwarded according to the routing table. On the other hand, in the case where there is no information on destination in the routing table, the GW checks a node identifier-locator forwarding table to be described later. A packet is transmitted to the destination node, with reference to this node identifier-locator forwarding table.

When the packet arrives at the destination node, a lower layer of the destination node receives the packet, and forwards this to the network layer. The network layer of the destination node removes the network header of the packet and sends to the identity layer.

The identity layer checks the identity layer header including the aIDs of the destination node and the home node of the packet. The identity layer searches the corresponding pID from the mapping table, removes the identity layer header, and forwards this to the transport layer via an interface specified by the node name and the pID.

The transport layer checks the checksum present in a transport header, and in case the checksum is correct, removes the transport header, and forwards this packet to the application layer via an interface specified by the transport port number.

In this way, a data is sent from the home node to the destination node. According to this method, end-to-end communication can be performed by utilization of the locators of the home and the destination nodes.

Exemplification was given above on transmission using the pID and the aID, and by this method, disclosure of the destination or the home, in communication between the nodes, can be avoided. In general, in packet communication, the node identifier of the identity layer header can be known from outside during packet communication. However, in the present invention, because the pID is used as the node identifier of the identity layer header of the packet, the pID is not used other than here, and does not appear in the packet header, a third party cannot recognize this. Therefore, by changing from the pID to the aID afterwards, disclosure of the pID can be avoided.

It should be noted that the application layer or the transport layer of the node can use the same or different pID in different packet communication, at the same time or separately. Therefore, there may be the case where the pID in a certain session is different from the aID in other session. Because all the node identifiers, which the node has, are composed of totally the same node name and the H-IS name, the node can mutually confirm the node identifiers composed of information interchanged in advance on hash algorism.

In addition, an exemplification was given above on the case of using the pID and the aID, however, packet communication may be performed by using either one of them.

(C-3) Packet Communication in a Hierarchical Communication Network

The communication network of the present invention can form a hierarchy structure, for example, as shown in FIG. 4.

Explanation will be given on routing in the case where a packet is transmitted by a home node 1 to a destination node 3, in FIG. 4. In the network header of the packet of the node 1, the locators of both of {GL1, RL1, LL1} and {GL3, RL3, LL3} are described. The node 1 dispatches the packet to the local network 1. The local network 1 finds out a local locator LL3, which is a destination of the packet, from the header, and forwards this to the GW of the local network 1 and a regional network 1. This GW finds out the regional locator RL3, which is a destination of the packet, from the header, and forwards this to the GW of the regional network 1 and the global network. In the global network, routing of this packet is performed to the GW, which is the GW of the global network and a regional network 3, and assigned with the GL3, based on the global locator GL3 of a destination node 3. Then this GW forwards this packet to the GW of the local network 3, based on the regional locator RL3 of the destination node 3. This GW forwards this packet to the destination node 3, based on the local locator LL3 of the destination node 3.

In the present invention, the regional network may be configured by multi-layers composed of two or more layers. In the present invention, it is possible to configure such a hierarchy structure, to use a different locator, or to adopt a different routing system by each layer. For example, an adoption method can be selected as appropriate, corresponding to applications, such as a pre-fix-based locator or routing is adopted in the global network; or a geographical locator or a routing method is adopted in the regional network.

Figure 15:
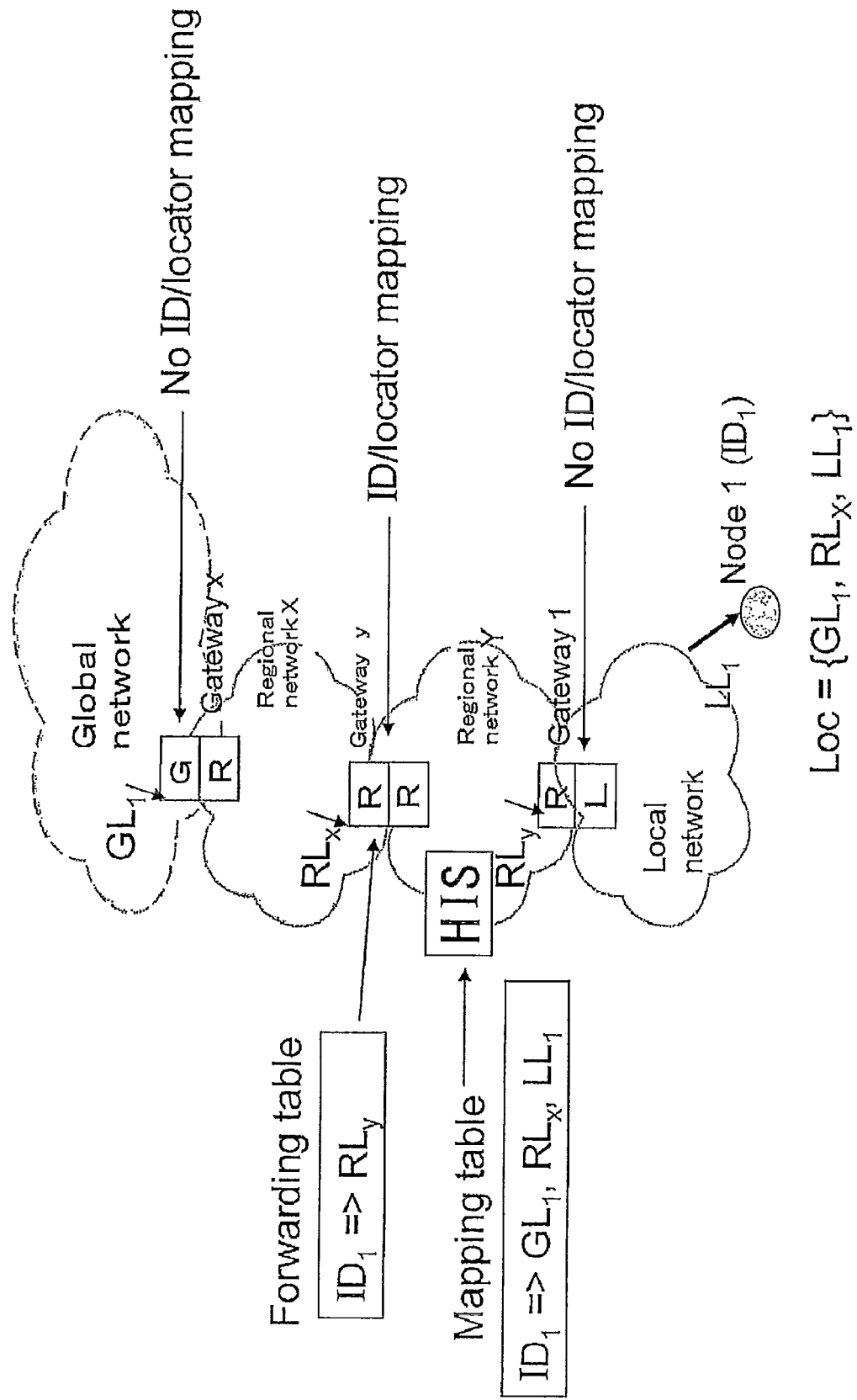
FIG. 15 is a drawing for explaining a packet forwarding method, in the case where two regional network layers are laminated, in the communication network of the present invention

Packet routing in a hierarchy communication network, where such a regional network layer is composed of multi-layers, can be performed as follows. Explanation will be given on a packet communication method in a layer configuration, where a regional network X is connected at the lower level of the global network; a regional network Y is connected at the lower level of the regional network X; the local network is connected at the lower level of the regional network Y; and a node is connected to this local network, with reference to FIG. 15. In the case where the communication network has three layers composed of the global network, the regional network and the local network, the GW was able to perform the routing of packet without performing mapping of the node identifier and the locator. However, in the case where the regional network is multi-layer of two or more layers, it is necessary for the GW to perform mapping of the node identifier and the locator, to subject the regional network to routing. Mapping information of the node identifier and the locator between such adjacent regional networks is called a forwarding table.

The node 1 is assumed to be connected to a local network 1. The node 1 requests assignment of the locator to the H-IS, in the locator assignment request (LocAssignReq) of the signaling message for communication initiation. The H-IS assigns the locator {GL1, RLx, LL1} to this node 1, in the locator assignment report (LocAssignRep). This information becomes the mapping table. The regional locator (RLx) included in this locator belongs to the higher level regional network X of the regional network Y, where the local network 1 connects.

This H-IS forwards the aID, the locator {GL1, RLx, LL1} and the regional locator RLy of the node 1 to the GWy. This GWy stores the aID and the RLy as the forwarding table.

In the case where a certain node from the global network requests communication with the above node 1, a destination of a network header of a packet becomes the locator {GL1, RLx, LL1} of the node 1. This packet is forwarded to the GWx, and the GWx finds out the regional locator RLx of the packet header, and forwards this to the GWy, according to the routing table.

Next, the GWy receives the packet for the node 1, and checks the regional locator present in the network header of the packet. The regional locator (RLx) belongs to the regional network X, however, the regional network Y is not recognized by the regional network RLx. In this case, the GWy can find out the aID of the corresponding node 1, based on the forwarding table, and can know that this packet should be forwarded to the regional locator of the GW1.

When the packet arrives at the GW1, the local locator LL1 is checked, and the packet is forwarded to the local locator LL1, based on the routing table.

In this way, the routing of packet can be performed by using mapping of the aID and the locator in the GW, which connects between adjacent regional networks like GWy etc.

(C-4) Communication by the Reference Locator

As described above, the H-IS and the F-IS can be included in the node in addition to a mobile communication device such as a mobile phone. Furthermore, the locator can be assigned to the H-IS and the F-IS. For example, by making a DSN server corresponded to the H-IS name and the locator of the H-IS, it is possible to make this locator function as the locator as it is. As described above, in the present invention, the node identifier, wherein such correspondence is ensured, is called a reference locator. By using the reference locator, it is possible to perform the routing of packet without the above steps (A) to (C).

In this way, by introducing concept of the reference locator, for example, in the case where communication is performed between the node in the home network and the H-IS, it is possible to communicate with the H-IS, without acquiring an actual locator of the destination node (H-IS) by the above (C). In addition, in the case where communication is performed between the H-IS and the F-IS, it is possible to perform packet routing, without acquiring the locators of the H-IS and the F-IS by the above (A) to (C). Therefore, it is effective to a single packet communication, in the case where an end-to-end configuration for resolving the node identifier-locator cannot be utilized, a sensor network, or in the case where the locator resolution for a network overhead is not effective.

It should be noted that only the locators of the H-IS and the F-IS are qualified to be the reference locator. It is because the node name of the H-IS or the F-IS is a globally unique one, the node identifier thereof is also globally unique, and therefore location can be specified. In addition, because the H-IS is the identity server of the home network of the node, one, which enables to perform the routing of packet using the node identifier of the H-IS as the locator, is limited to in the own home network.

In the case where the reference locator is used, the routing of packet can be performed by describing, for example, the node identifier of the H-IS as the destination address of the identity layer header. As described above, because the H-IS has the correspondence table such as special verify information, the node name, the node identifier, the locator, in the case where a packet having the node identifier as an address is received, the H-IS can specify the locator, based on the relevant correspondence table, describe the locator corresponding to the above node identifier, and shorten processing time without performing a question to the DSN.

Similarly, by describing the node identifier of the H-IS or the F-IS to the identity layer header of both of the home and the destination, adding the network layer header in the H-IS, the F-IS, or the GW, and describing the locator instead of the node identifier, the routing of packet can be performed.

(6) Applications

In the packet communication method of the present invention, packet communication is performed by using the node identifier. This node identifier is composed of the node name and the H-IS name, and the H-IS of the relevant node can be known easily from the node identifier. Therefore, by knowing the H-IS, the home network belonging to the relevant node can be known. In addition, by using an identifier of the H-IS or an identifier of the F-IS, as the reference locator, processing time can be shortened.

Furthermore, according to the method for using the reference locator, it is superior in that, even in the case where the node is a mobile communication device etc. and actual location of the node changes in a short time, a transmission packet can be transmitted at least to the F-IS. In the present invention, because communication is performed by the node identifier and the locator, originally all the nodes are necessary to have the locator for packet transmission. However, by using the reference locator, it is possible to transmit the packet as far as to the H-IS or the F-IS, even in the case where the actual locator of the destination node is not known.

Further, a network can be made by using a device-specific name, and the node can be specified easily in the network such as the home network or the sensor network. For example, the node in the home network can have a name such as camcoder, mypc, homegateway, tv, vcr, and pda. Therefore, node management can be made easy. Therefore, packet communication, particularly in the sensor network, can be performed suitably.

On the other hand, even in the case where a device named, for example, pda, moves from a certain home network to other home network, to acquire the locator in connection with the network, access for communication can be performed from other network or the above home network. Therefore, it can be used suitably for packet communication in mobile device communication.

As the present invention, by separating the node identifier and the locator, and configuring the communication network in a hierarchy way, it is possible to form hierarchy in the locator assigned to each network. By hierarchization of the locator, compact sizing of the routing table of the global network is possible.

A routing system of each network or a system of the locator can be developed without receiving influence of other networks.

The invention claimed is:

1. A packet communication method for data between a home node and a destination node, which is performed via a communication network connected with an identity server (H-IS) storing a bundle of locators and a node identifier of each of nodes belonging to a home network, the method comprising:
a step in which the home node provides the node identifier of the home node and
requests an assignment of a locator of the home node from the identity server (H-IS);
a step in which the identity server (H-IS) assigns the locator of the home node to the home node, and stores correspondence relationship between the node identifier of the home node and the locator of the home node;
a step in which the home node provides the node identifier of the destination node and requests an assignment of the locator of the destination node from an identity server (dH-IS) of the destination node;
a step in which the identity server (dH-IS) of the destination node assigns the locator of the destination node to the destination node, and stores correspondence relationship between the node identifier of the destination node and the locator of the destination node;
a step in which a packet header, where the destination address and the home address have been specified by the node identifier of the destination node and the node identifier of the home node, is rewritten with the locator of the destination node and the locator of the home node; and
a step in which the communication network conducts a routing of the packet, based on the locator of the home node and the locator of the destination node;
wherein the identity server (H-IS) of the home network store special verification information on the node identifier of the home node, which is generated by introducing additional parameters in a hash function, corresponding to the node identifier of the home node.

2. The packet communication method according to claim 1, wherein the correspondence relationship between the node identifier and the locator of the home node, and the correspondence relationship between the node identifier and the locator of the destination node, are transmitted to corresponding gateways and are stored in the corresponding gateways.

3. The packet communication method according to claim 1, wherein each of the nodes belonging to the home network has a node name uniquely specified by the identity server (H-IS) of the home network, and the node identifier of a corresponding node, which is located in the home network or in a foreign network, is obtained by sending a request, containing the node name of the corresponding one of the nodes of the home network, to the identity server (H-IS) of the home network.

4. The packet communication method according to claim 3, wherein the node name includes a connector between the local node names of the nodes of the home network and a name of the identity server (H-IS) of the home network, and the connector is symbol #.

5. The packet communication method according to claim 1, wherein the identity server (H-IS) of the home network further store a bit stream.

6. The packet communication method according to claim 5, wherein bit streams of a plurality of node identifiers for a same node are generated by introducing different parameters to the cryptographic hash function, and
the destination address and the home address have been specified by the node identifier (pID) of the destination node and the node identifier (pID) of the home node, are rewritten with the node identifier (aID) of the destination node and the node identifier (aID) of the home node, and then the aIDs of the home and the destination nodes are rewritten with the locator of the destination node and the locator of the home node.

7. The packet communication method according to claim 5, wherein the step for requesting the assignment of the locator of the destination node by the home node is performed after the request is transmitted to the identity server (dH-IS) together with the special verification information, and is verified in the identity server (dH-IS) with the special verification information.

8. The packet communication method according to claim 1, wherein the communication network has a two-hierarchy structure of a global network and a local network connected to a lower level of the global network; and
the identity server (H-IS) of the home network and an identity server (F-IS) of a foreign network respectively assign a unique global locator in the global network and a unique local locator in the local network to a node.

9. The packet communication method according to claim 1, wherein the communication network has a three-hierarchy structure of a global network, a regional network connected to a lower level of the global network, and a local network connected to a lower level of the regional network; and
the locator assigned to a node by the identity server (H-IS) of the home network is a combination of the global locator, the regional locator and the local locator.

10. The packet communication method according to claim 9, wherein the regional network is a multi-layer of equal to or more than two, and a packet routing between a higher layer of the regional network and a lower layer of the regional network is performed based on a forwarding table of a gateway connecting two layers of the regional network.

11. The packet communication method according to claim 1, wherein the home node or the destination node is a sensor node or a mobile communication device.

12. The packet communication method according to claim 2, wherein each of the nodes belonging to the home network has a node name uniquely specified by the home network, and the node identifier of a corresponding node, which is located in the home network or in a foreign network, is obtained by sending a request, containing the node name of the corresponding one of the nodes of the home network, to the identity server (H-IS) of the home network.

13. The packet communication method according to claim 6, wherein the step for requesting the assignment the locator of by the home node is performed after the request is transmitted to the identity server (dH-IS) together with the special verification information, and is verified.

* * * * *